United States Patent [19]

Crutcher

[11] Patent Number: 5,964,834
[45] Date of Patent: Oct. 12, 1999

[54] SYSTEM GROUPING CLIPBOARD MEMORIES ASSOCIATING WITH COMPUTERS IN A NETWORK INTO A SHARED CLIPBOARD MEMORY FOR SHARING DATA OBJECT IN THE NETWORK

[75] Inventor: Paul M. Crutcher, Rochester, Minn.

[73] Assignee: International Business Machines Corporation, Armonk, N.Y.

[21] Appl. No.: 08/936,446

[22] Filed: Sep. 24, 1997

[51] Int. Cl.[6] .................................................... G06F 13/00
[52] U.S. Cl. ............................ 709/213; 709/216; 709/218
[58] Field of Search .................................... 709/213, 216, 709/218

[56] References Cited

U.S. PATENT DOCUMENTS

| 5,386,564 | 1/1995 | Shearer et al. | 395/650 |
| 5,579,521 | 11/1996 | Shearer et al. | 395/680 |
| 5,752,254 | 5/1998 | Sakairi | 707/530 |

Primary Examiner—Le Hien Luu
Attorney, Agent, or Firm—Felsman, Bradley, Gunter & Dillon; Andrew J. Dillon

[57] ABSTRACT

A method and system for sharing data in a computer network having multiple processors enrolled therein. A local clipboard memory is initially associated with each processor enrolled in the computer network. A data object from an application within a processor enrolled in a computer network is thereafter transferred to the clipboard memory associated with that processor, in response to user input. The data object is thereafter automatically transferred to some or all clipboard memories of the other processors enrolled in the computer network. As a result of the automatic transference of the data object to the other clipboard memories of the processors enrolled in a network, applications running on those processors enrolled in the computer network can be directed, via user input, to retrieve the data object from the local clipboard memory of that processor. The clipboard memories contained within processors enrolled in the computer network can be grouped into one or more logical shared clipboard memories, thus allowing for the existence of one or more shared clipboards within the processors enrolled in the computer network.

14 Claims, 7 Drawing Sheets

SYSTEM GROUPING CLIPBOARD MEMORIES ASSOCIATING WITH COMPUTERS IN A NETWORK INTO A SHARED CLIPBOARD MEMORY FOR SHARING DATA OBJECT IN THE NETWORK

BACKGROUND OF THE INVENTION

1. Technical Field

The present invention relates in general to improved information processing systems. In particular, the present invention relates to improved information processing systems operating within computer networks. Still more particularly, the present invention relates to methods and systems for sharing data between information processing systems operating within computer networks.

2. Description of the Related Art

As the world of computing evolves toward a distributed topology, computer networks become the vital link between modem computing devices. A computer network can be viewed as a collection of computing devices linked together in such a manner as to allow the sharing of electronic data to benefit a defined user community. Computing devices can include mainframe computers, mini-computers, micro-computers, terminals, and printers. Micro-computers are often referred to in the art as workstations. Workstations are typically self-sufficient computers that possess input, output, and storage devices as well as a processing complex. Modem workstations demand a sophisticated operating system to fully exploit their advanced hardware. Thus, modern workstation operating systems provide many advanced capabilities including a graphical user interface and support for the multitasking of application programs.

Most modem workstation operating systems have a clipboard resource that provides a mechanism for a user to control the sharing of information between application programs running on the same workstation. A clipboard is a special memory resource owned and managed by the operating system. An application program must be specifically written to provide support for the clipboard using clipboard APIs provided by the operating system.

All clipboard enabled applications on a workstation typically share the same clipboard. A clipboard enabled application exposes the clipboard to the end user via three edit operations called "cut","copy", and "paste." Terms such as "cut", "copy", and "paste" are well known and commonly utilized in the art of computer clipboard enabled applications. The "cut" edit operation provides a way for the user of an application program to move selected data from that application program into the clipboard. The "copy" edit operation provides a way for the user of an application program to place a copy of selected data from that application program into the clipboard. The "paste" edit operation provides a way for the user of an application program to place a copy of the contents of the clipboard into that application program. Typically, an operating system implements a clipboard such that data retrieval operations ("paste" edit operation) are nondestructive with respect to the clipboard and data store operations ("cut" and "copy" edit operations) are destructive with respect to the clipboard. The user of a workstation typically uses the operating system provided clipboard as a temporary data storage location within an application program as well as a shared data storage location that can be accessed from different application programs running on that workstation.

A clipboard can be summarized as an operating system provided data storage area that can be manipulated by the user to transfer data within an application program or between application programs on the same workstation. The data involved is selected by the user of an application program on a workstation and can be of many different forms including text, image, and sound. As network based multi-workstation environments become prolific, a user is often confronted with a need to share clipboard information between applications running on different workstations.

Today, a user is presented with a few basic techniques for sharing information between applications running on peer workstations (i.e., workstations included within a computer network); the user can manually recreate the data on the peer workstation, the user can copy the data from the local clipboard and paste it into a mail facility for transport to a peer workstation, or a user can copy the data from the local clipboard and save it into a file on a shared volume that can be accessed by a peer workstation. All of the techniques can be time consuming for the user and the latter two require additional steps to retrieve the data from the mail/file store and update the clipboard on the receiving workstation.

From the foregoing it can be appreciated that a need exists for a method of sharing information that would automatically share data among clipboards of multiple workstations, without the time consuming user operations inherent with present information sharing techniques. From the foregoing it can also be seen that an application program to implement such a method of sharing would greatly benefit application users on networked workstations.

SUMMARY OF THE INVENTION

It is therefore one object of the present invention to provide an improved information processing system.

It is therefore another object of the present invention to provide improved information processing systems that can be implemented within computer networks.

It is yet another object of the present invention to provide an improved method and system for sharing data within computer networks.

It is still another object of the present invention to provide a shared clipboard that can be accessed by applications running on processors enrolled within a computer network.

The above and other objects are achieved as is now described. A method and system are disclosed for sharing data in a computer network having multiple processors enrolled therein. A local clipboard memory is initially associated with each processor enrolled in the computer network. A data object from an application within a processor enrolled in a computer network is thereafter transferred to the clipboard memory associated with that processor, in response to user input. The data object is thereafter automatically transferred to some or all clipboard memories of the other processors enrolled in the computer network. As a result of the automatic transference of the data object to the other clipboard memories of the processors enrolled in a network, applications running on those processors enrolled in the computer network can be directed, via user input, to retrieve the data object from the local clipboard memory of that processor. The clipboard memories contained within processors enrolled in the computer network can be grouped into one or more logical shared clipboard memories, thus allowing for the existence of one or more shared clipboards within the processors enrolled in the computer network.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of a preferred embodiment when read in conjunction with the accompanying drawings, wherein:

DETAILED DESCRIPTION OF PREFERRED EMBODIMENT

Figure 1:
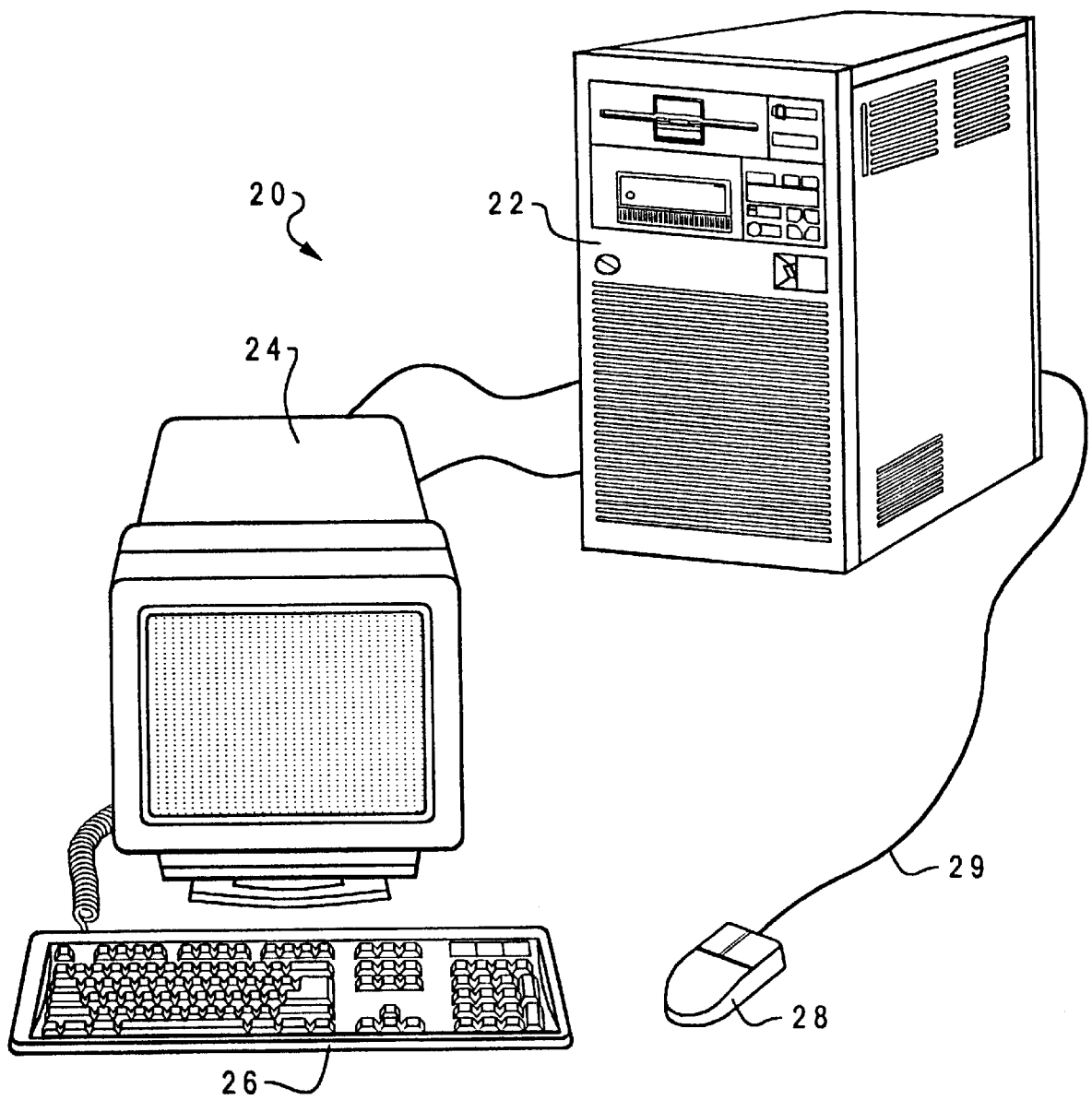
FIG. 1 illustrates a pictorial representation of a computer system which may be utilized to implement a preferred embodiment of the present invention.

With reference now to the figures and in particular with reference to FIG. 1, there is depicted a pictorial representation of a computer system which may be utilized to implement a preferred embodiment of the present invention. A computer system 20 is depicted that includes a system unit 22, a video display 24, a keyboard 26, and a mouse 28. Keyboard 26 is that part of computer system 20 that resembles a typewriter keyboard and which enables a user to control particular aspects of the computer. Because information flows in one direction, from keyboard 26 to system unit 22, keyboard 26 functions as an input-only device. Functionally, keyboard 26 represents half of a complete input/output device, the output half being video display 24. Keyboard 26 includes a standard set of printable characters presented in a QWERTY pattern typical of most typewriters. In addition, keyboard 26 includes a calculator-like numeric keypad at one side. Some of these keys, such as the "control," "alt," and "shift" keys can be utilized to change the meaning of another key. Other special keys and combinations of keys can be utilized to control program operations or to move either text or cursor on the display screen of video display 24.

Mouse 28 is a commonly utilized pointing device. The basic features of a typical mouse include a casing with a flat bottom that is designed to be gripped by one human hand. A typical mouse also includes one or more buttons located atop the mouse, and a multidirectional detection device (e.g., usually a ball) located on the bottom of the mouse. A cable 29 connects mouse 28 to a computer such as computer system 20. By moving mouse 28 on a surface (e.g, a desk surface or a mouse pad), the user typically controls an on-screen cursor. Such a mouse is a relative pointing device, because the mouse's movement is not defined by limitations, and also because its placement on a surface does not map directly to a specific location on a computer screen. Generally, to select items or choose commands on a screen displayed graphical user interface, the user presses one or more mouse buttons, producing a so-called mouse "click." The mouse can be utilized to manipulate a mouse pointer which is an on-screen element whose location changes as the user moves the mouse. Depending on the location of the mouse pointer and the operation of the program with which it is working, the area of the screen where the mouse pointer appears serves as the target for an action when the user presses one of the mouse buttons.

Figure 2:
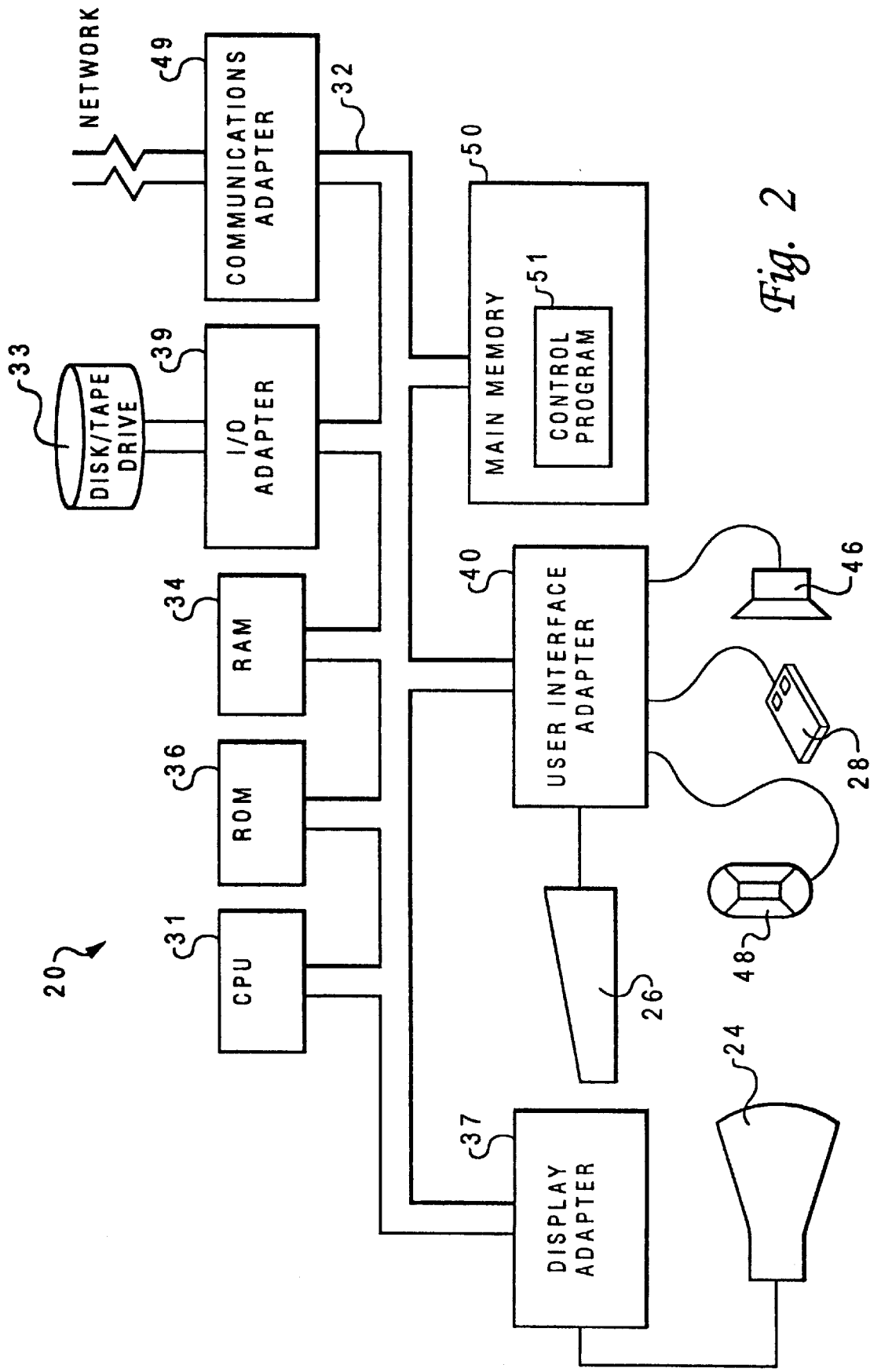
FIG. 2 depicts a representative hardware environment of the computer system illustrated in FIG. 1.

Computer system 20 can be implemented utilizing any suitable computer such as the AS/400 computer system or IBM "Aptiva" computer, both products of International Business Machines Corporation, located in Armonk, N.Y. However, those skilled in the art will appreciate that a preferred embodiment of the present invention can apply to any computer system, regardless of whether the computer system is a complicated multi-user computing apparatus or a single-user workstation or a network computer. In FIG. 1 and FIG. 2, like parts are identified by like numbers. Computer system 20 is thus a configuration that includes all functional components of a computer and its associated hardware. In general, a typical computer system includes a console or system unit such as system unit 22, with one or more disk drives, a monitor such as video display 24, and a keyboard such as keyboard 26. Additional hardware, often referred to in the art as peripheral devices, can include devices such as printers, modems, and joysticks.

FIG. 2 depicts a representative hardware environment of the computer system illustrated in FIG. 1. Computer system 20 includes a Central Processing Unit ("CPU") 31, such as a conventional microprocessor, and a number of other units interconnected via system bus 32. CPU 31 includes a portion of computer system 20 that controls the operation of the entire computer system, including executing the arithmetical and logical functions contained in a particular computer program. Although not depicted in FIG. 2, CPUs such as CPU 31 typically include a control unit that organizes data and program storage in a computer memory and transfers the data and other information between the various parts of the computer system. Such CPUs also generally include an arithmetic unit that executes the arithmetical and logical operations, such as addition, comparison, multiplications and so forth. Such components and units of computer system 20 can be implemented in a system unit such as system unit 22 of FIG. 1.

Computer system 20 further includes random-access memory (RAM) 34, read-only memory (ROM) 36, display adapter 37 for connecting system bus 32 to video display 24, and I/O adapter 39 for connecting peripheral devices (e.g., disk and tape drives 33) to system bus 32. RAM 34 is a type of memory designed such that the location of data stored in it is independent of the content. Also, any location in RAM 34 can be accessed directly without having to work through from the beginning. ROM 36 is a type of memory that retains information permanently and in which the stored information cannot be altered by a program or normal operation of a computer.

Video display 24 is the visual output of computer system 20. Video display 24 can be a cathode-ray tube (CRT) based video display well-known in the art of computer hardware. However, with a portable or notebook-based computer, video display 24 can be replaced with a liquid crystal display (LCD) based or gas plasma-based flat-panel display. Computer system 20 further includes user interface adapter 40 for connecting keyboard 26, mouse 28, speaker 46, microphone 48, and/or other user interface devices, such as a touchscreen device (not shown), to system bus 32. Communications adapter 49 connects computer system 20 to a computer network. Although computer system 20 is shown to contain only a single CPU and a single system bus, it should be understood that the present invention applies equally to computer systems that have multiple CPUs and to computer systems that have multiple buses that each perform different functions in different ways.

Computer system 20 also includes an interface that resides within a machine-readable media to direct the operation of computer system 20. Any suitable machine-readable media may retain the interface, such as RAM 34, ROM 36, a magnetic diskette, magnetic tape, or optical disk (the last three being located in disk and tape drives 33). Any suitable operating system and associated interface (e.g., Microsoft Windows) may direct CPU 31. For example, the AIX operating system and AIXwindows windowing system can direct CPU 31. The AIX operating system is IBM's implementation of the UNIX™ operating system. "UNIX" is a trademark of UNIX Systems Laboratories, Inc. Other technologies also can be utilized in conjunction with CPU 31, such as touch-screen technology or human voice control. Operating systems typically include computer software for controlling the allocation and usage of hardware resources such as memory, CPU time, disk space, and peripheral devices. The operating system is the foundation upon which applications, such as word-processing, spreadsheet, and web browser programs are built.

Those skilled in the art will appreciate that the hardware depicted in FIG. 2 may vary for specific applications. For example, other peripheral devices such as optical disk media, audio adapters, or chip programming devices, such as PAL or EPROM programming devices well-known in the art of computer hardware and the like, may be utilized in addition to or in place of the hardware already depicted. In addition, main memory 50 is connected to system bus 32, and includes a control program 51. Control program 51 resides within main memory 50, and contains instructions that, when executed on CPU 31, carries out the operations depicted in the logic flowchart of FIG. 7 and FIG. 8 described herein. The computer program product also can be referred to as a program product. Control program 51 contains instructions that when executed on CPU 31 can carry out logical operations such as those operations depicted in the logic flow charts of FIG. 7 and FIG. 8 described herein.

It is important to note that, while the present invention has been (and will continue to be) described in the context of a fully functional computer system, those skilled in the art will appreciate that the present invention is capable of being distributed as a program product in a variety of forms, and that the present invention applies equally regardless of the particular type of signal-bearing media utilized to actually carry out the distribution. Examples of signal-bearing media include: recordable-type media, such as floppy disks, hard disk drives, and CD ROMs, and transmission-type media such as digital and analog communication links. Examples of transmission media include devices such as modems. Modems are communication devices that enable computers such as computer 20 depicted in FIG. 1 and FIG. 2 to transmit information over standard telephone lines.

Figure 3:
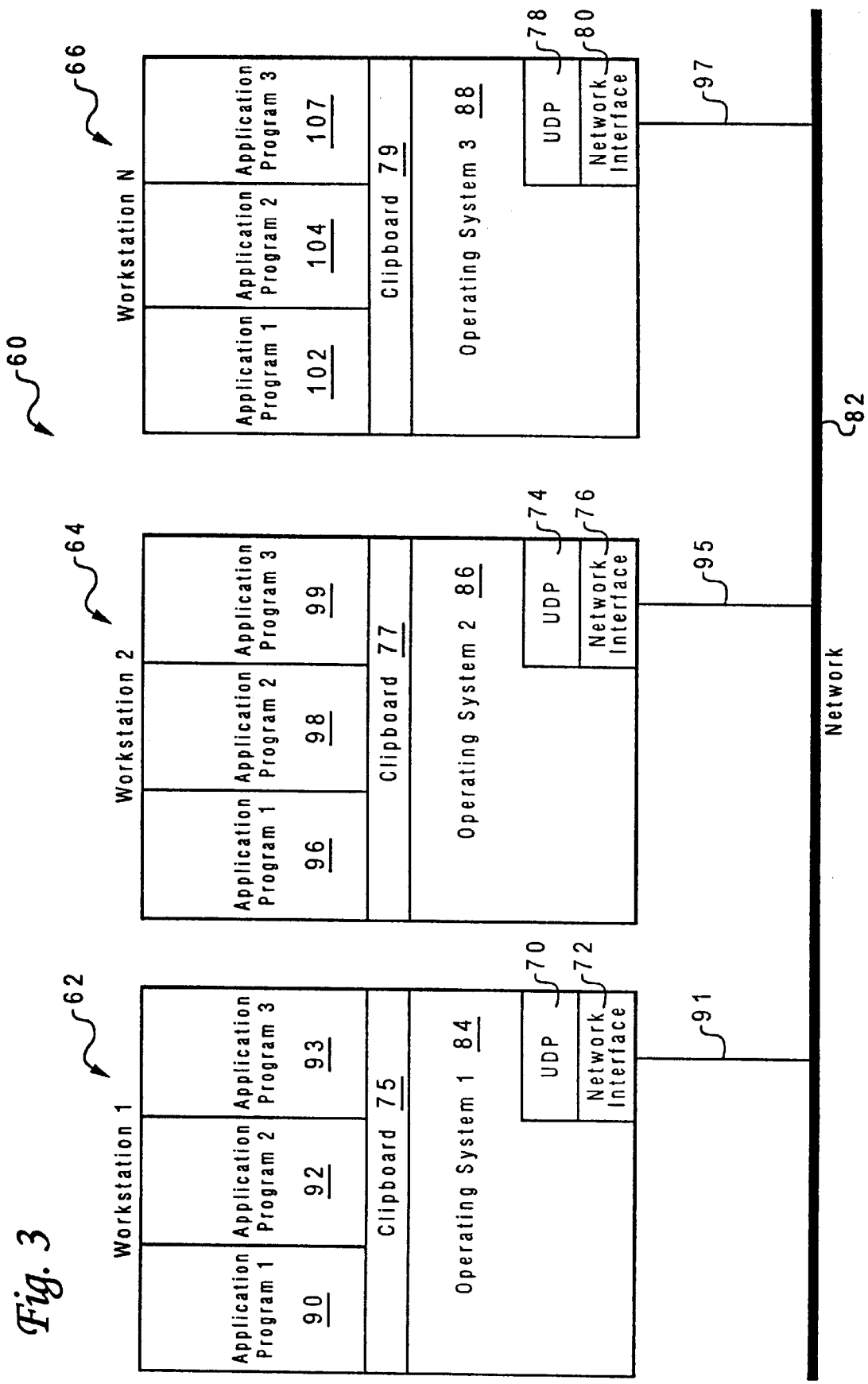
FIG. 3 illustrates a block diagram representative of networked machines without a common shared clipboard.

FIG. 3 illustrates a block diagram representative of a network 60 having networked machines without a common shared clipboard. Note that in FIG. 3 and FIG. 4, like parts are indicated by like numbers. Network 60 includes an "N" number of networked machines. A network is essentially a group of computers (e.g., workstations, terminals, etc.) and associated machines that are connected by communications facilities. A network can involve permanent connections, such as cables, or temporary connections made through telephone or other communications links. A network can be as small as a local area network (LAN) which includes a few computers, printers, and other devices, or the network can include many small and large computers distributed over a vast geographic area. Small or large, a computer network exists to provide users with a manner for communicating and transferring information electronically.

Those skilled in the art will appreciate that the network described herein is a generic network and thus various types of networks can be utilized in accordance with a preferred embodiment of the present invention. For purposes of illustration only, however, it can be assumed that network 60 is a LAN. A LAN is a group of computers and other associated machines dispersed over a relatively limited area and connected by a communications link that enables any device within the LAN to interact with any other device on the network. LANs commonly include microcomputers such as computer 20 depicted in FIG. 3 and FIG. 4 herein and shared resources such as laser printers and large hard disks. Most LANs typically can support a wide variety of computers and other devices. Each device utilizes physical and data-link protocols for the particular LAN, and all devices that desire to communicate with other devices on the LAN must utilize an identical upper-level communications protocol. Although LANs are geographically limited, separate LANs can be connected to form larger networks. Similar LANs are linked by "bridges," which act as transfer points between networks. Dissimilar LANs are linked by gateways, which both transfer data and convert the data according to protocols utilized by the receiving network.

Thus, each machine included within network 60 can include a processor such as a workstation or terminal. Each processor can be composed of a computer such as computer 20 depicted in FIG. 1 and FIG. 2 herein. Within each processor are contained application programs. Such application programs are computer programs designed to assist users in performing certain type of work. An application program is different from an operating system, which runs a computer, and a utility, which performs maintenance or general-purpose chores. An application program also differs from a language with which computer programs are created. Depending on the work for which it was designed, an application program can manipulate text, numbers, graphics, sound files, video files, or a combination of such elements. Some application programs, such as word processors, offer considerable computing power by focusing on a single task such as word processing. Other application programs, referred to often as integrated software, offer less power but include several application programs, such as a word processor, spreadsheet, and database program.

Thus, workstation 62 includes a first application program 90, a second application program 92, and a third application program 93. Workstation 64 includes a first application program 96, a second application program 98, and a third application program 99. Workstation 66 includes a first application program 102, a second application program 104, and a third application program 107. In addition each workstation contains an individual operating system, a network interface, and a User Datagram Protocol (UDP) port, well known in the art of communications protocols. Workstation 62 includes a first operating system 84, a UDP port 70, and a network interface 72. Workstation 64 includes a second operating system 86, a UDP port 74, and a network interface 76. Workstation 66 includes an "Nth" operating system 88, a UDP port 78, and a network interface 80. A UDP is available as a part of most TCP implementations on most operating systems.

A UDP port is a hardware device connected to each computer for handling communications protocols. In communications, computer, data-processing, and control systems, protocols are a set of formal conventions that govern the format and control the interactions between two communicating functional units. Those skilled in the art can appreciate that although UDP port is adapted for a preferred embodiment of the present invention as illustrated herein, other protocols and protocol ports may also be utilized in accordance with a preferred embodiment of the present invention. Those skilled in the art will appreciate that a UDP is not hardware, but is an implementation of UDP programming. In the TCP/IP protocol suite, the UDP provides the chief mechanism by which application programs send datagrams to other application programs. UDP provides protocol ports which can discern multiple programs executing on a single machine. Those skilled in the art will appreciate that in addition to data transferred, each UDP message includes a destination port number and a source port number, which make it possible for the UDP software at the destination to deliver the message to the correct recipient and for the recipient to send a reply.

The network interfaces including within each workstation are points of interconnection between each workstation and the associated network. In addition, bus lines connect each workstation to a network line 82. Bus line 91 connects workstation 62 to network line 82 via network interface 72. Bus line 95 connects workstation 64 to network line 82 via network interface 76, and bus line 97 connects workstation 66 to network line 82 via network interface 80. Each workstation also includes an individual clipboard resource (i.e., a "clipboard"). Workstation 62 includes a clipboard 75, while workstation 64 includes a clipboard 77 and workstation 66 includes a clipboard 79. Each clipboard is essentially a data storage area utilized during the transfer of information within a clipboard enabled application or between clipboard enabled applications. Objects can be represented as text, image, graphics, video files, or audio files. Thus, a user can mark information and subsequently copy this information to the clipboard running on a particular workstation. This information can then be pasted into another application.

For example, assume a user is utilizing workstation 64 and its associated application programs to perform a particular task. During performance of this task, the user might desire to transfer data from first application program 96 to second application program 98. The user utilized the "copy" edit operation of first application program 96 to copy the selected data to clipboard 77. The user then utilizes the "paste" edit operation of second application program 98 to retrieve the clipboard data into second application program 98. Thus, those skilled in the art can appreciate that each clipboard depicted in FIG. 3 is a stand-alone clipboard, also referred to as a local clipboard. The user cannot copy data from applications contained in different workstations and paste such data into applications contained in other workstations utilizing these stand-alone clipboards.

Figure 4:
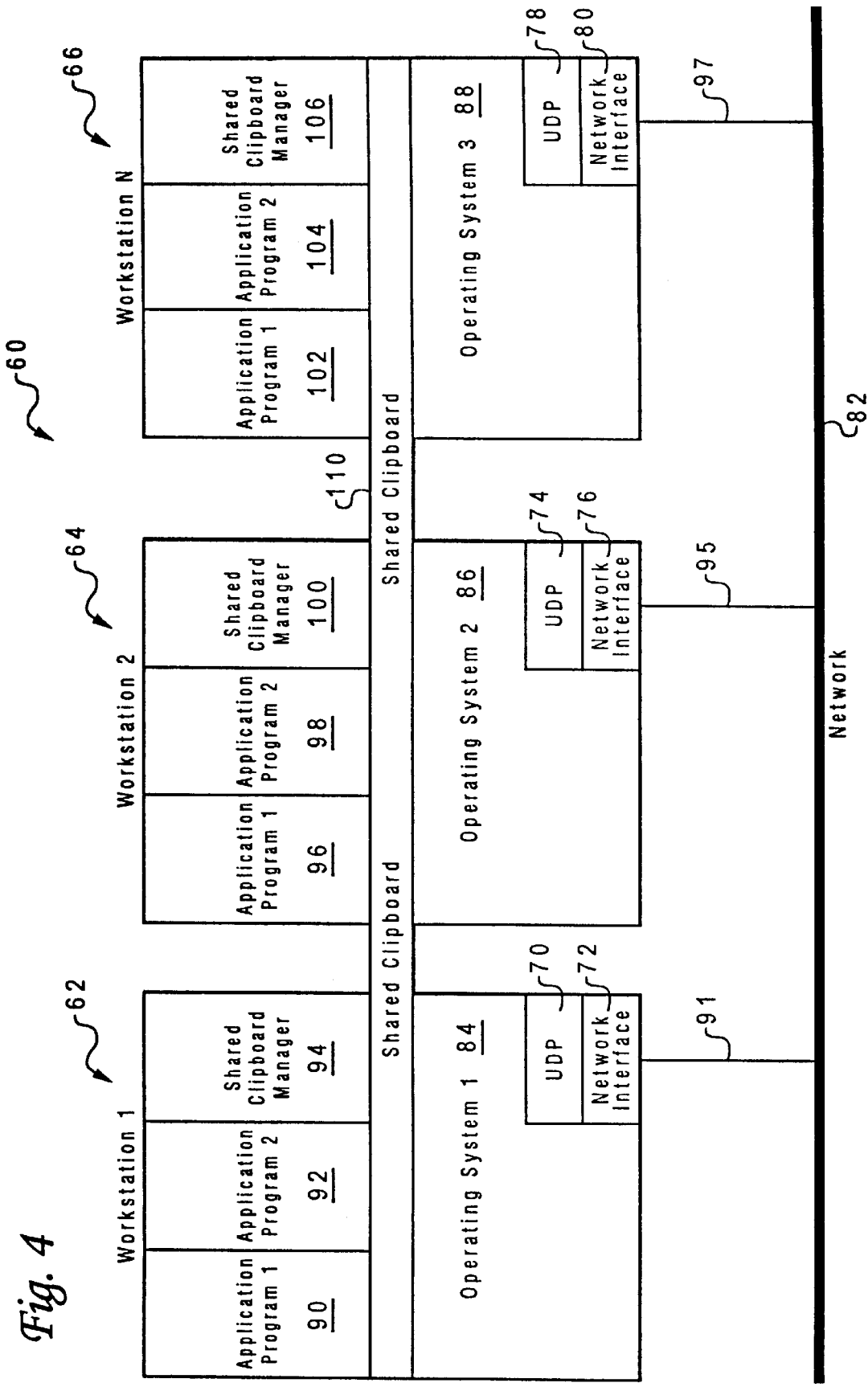
FIG. 4 illustrates a block diagram representative of networked machines which incorporate a network-based shared clipboard, in accordance with a preferred embodiment of the present invention.

FIG. 4 illustrates a block diagram representative of network 60 having networked machines incorporating a network-based shared clipboard 110, in accordance with a preferred embodiment of the present invention. As depicted in FIG. 4, workstation 62 includes a shared clipboard manager 94, while workstation 64 includes a shared clipboard manager 100, and workstation 66 includes a shared clipboard manager 106. A clipboard memory shared clipboard manager is associated with each workstation in network 60 in FIG. 4. Each shared clipboard manager can reside or access each clipboard memory associated with each workstation. Shared clipboard 110 is a shared resource for each workstation.

In the configuration of FIG. 4, the user defines a group of two or more workstations that the user desires to participate in shared clipboard 110. The user provides this group definition to the shared clipboard when it is run on a participating workstation. The shared clipboard application monitors the local clipboard contained within each workstation and searches for updates. In addition the shared clipboard application (i.e., shared clipboard 110) monitors a UDP port for remote updates from the participating workstations. When a local clipboard update occurs, the shared clipboard application copies the local clipboard data and sends this data to the participating workstations via a UDP transmission protocol.

When a remote update occurs, the shared clipboard application receives the data on a UDP port and updates the local clipboard, including each clipboard memory associated with each workstation.

Figure 5:
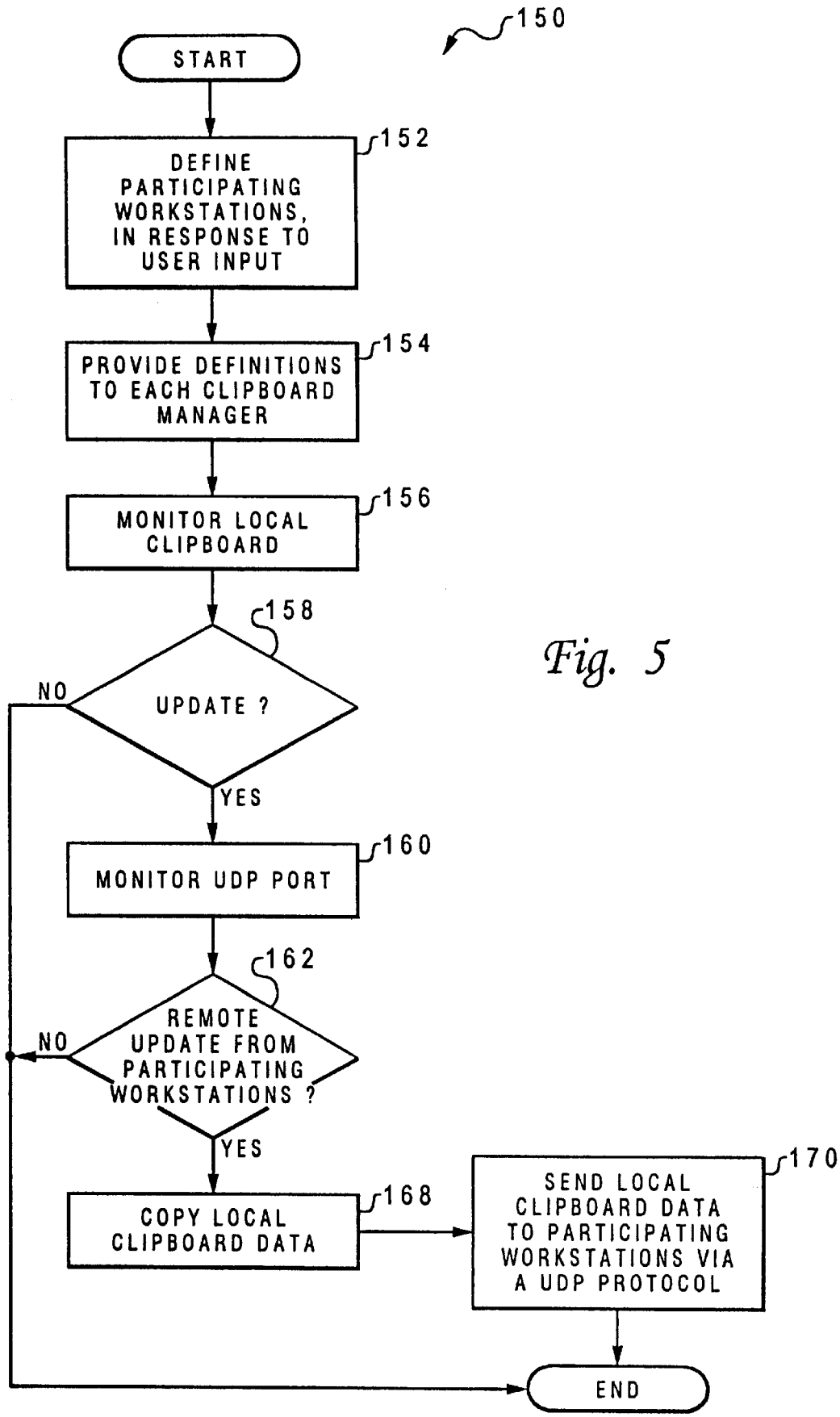
FIG. 5 illustrates a flow diagram that shows steps utilized to carry out a method for creating a virtual shared clipboard, according to a preferred embodiment of the present invention.

FIG. 5 illustrates a flow diagram 150 that shows steps utilized to carry out a method for creating a virtual shared clipboard, according to a preferred embodiment of the present invention. The virtual shared clipboard described in the steps depicted in FIG. 5 allows a user to "connect" separate clipboards contained on separate network based workstations. The workstations utilized in accordance with a preferred embodiment of the present invention can include stand alone microcomputers linked with other microcomputers and/or computers such as computer system 20 linked with other computers and peripheral devices such as printers or shared computer hardware resources. Thus, as depicted at block 152, the user defines a group of two or more workstations that the user desires to participate in the virtual shared clipboard. As illustrated at block 154, this group definition is provided to the shared clipboard manager which is running on the participating workstations. As described at block 156, the shared clipboard manager monitors the local clipboard (i.e., the clipboard contained on each workstation, as opposed to the shared clipboard which is shared by all the workstations) and updates the shared clipboard according to whether or not data is identified on a clipboard at a workstation, as described at block 158.

If it is determined that no data is identified and there is no need to update the local clipboard, the process simply ends. If however, it is determined that data is identified and the local clipboard must be updated, then as described at block 160, the shared clipboard manager monitors a UDP port searching for remote updates from the participating workstations. As illustrated at block 162, if a local update does not occur, then the process ends. However, as described at block 162, if a local update does occur, then the process continues and as described at block 168, when a local clipboard update occurs, the shared clipboard manager copies identified local clipboard data and sends this data to the participating workstations defined earlier via a reliable UDP transmission protocol, as illustrated at block 170. Thus, when a remote update occurs, the shared clipboard manager receives the data from the UDP port and updates the local clipboard. By implementing these steps, the user can cut/copy data on one workstation and paste the same data into an application contained at another workstation.

Figures 6A, 6B:
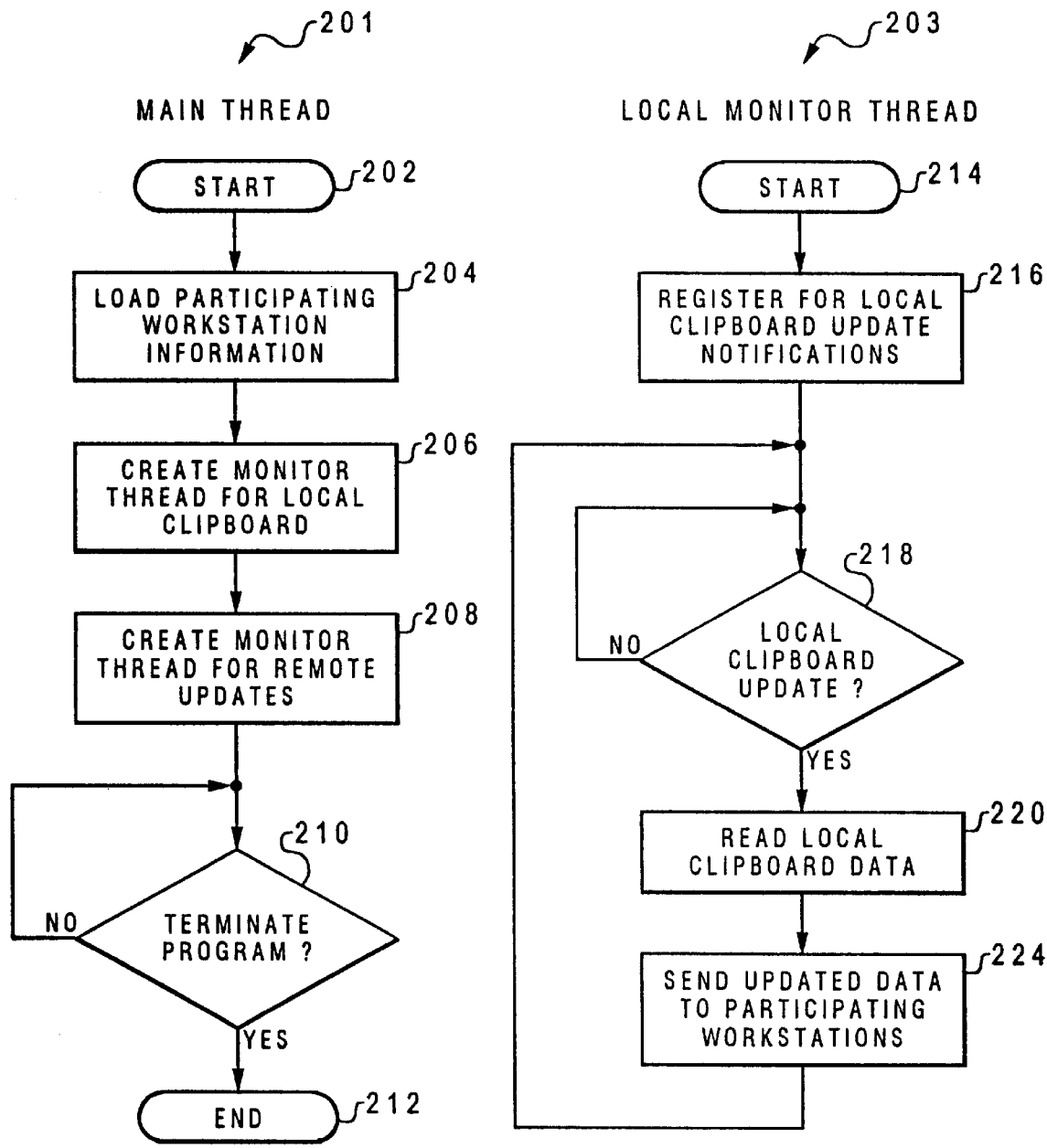
FIG. 6(a) depicts a flow diagram of a main thread, according to a preferred embodiment of the present invention.
FIG. 6(b) illustrates a flow diagram of a local monitor thread, according to a preferred embodiment of the present invention.
Figure 6C:
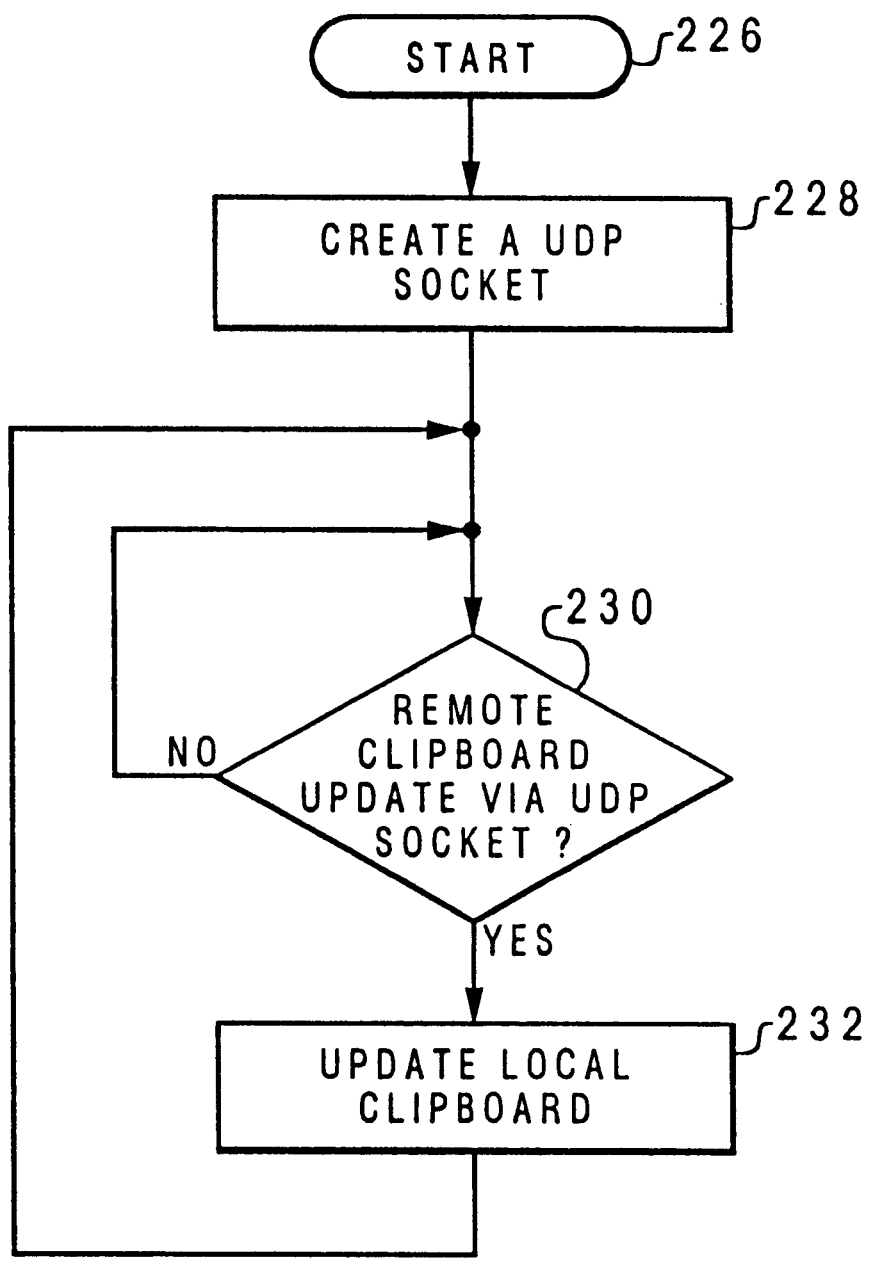
FIG. 6(c) depicts a flow diagram of a remote monitor thread, according to a preferred embodiment of the present invention.

FIG. 6(a), FIG. 6(b) and FIG. 6(c) illustrate alternative flow diagrams that show steps that may be utilized to carry out the method and system of the present invention, according to a preferred embodiment of the present invention. FIG. 6(a) depicts a flow diagram of a main thread 201, according to a preferred embodiment of the present invention. FIG. 6(b) illustrates a flow diagram 203 of a local monitor thread, according to a preferred embodiment of the present invention. FIG. 6(c) depicts a flow diagram 204 of a remote monitor thread, according to a preferred embodiment of the present invention. Local monitor thread 203 and remote monitor thread 204 show steps that further define specific steps depicted in main thread 201. Thus, in main thread 201, as depicted at block 202, the process is initiated. As illustrated at block 204, participating workstation information is loaded. As depicted at block 206, a monitor thread is then created for the local clipboard. As described at block 208, a monitor thread is then created for remote updates. As illustrated a block 210, a test is performed whether or not to terminate the process (i.e., the main thread program). If a decision is made to end the process, then as described at block 212, the process ends. However, if a decision is to continue the process, then the program continues to run, unless otherwise indicated.

Local monitor thread 203 describes specific steps utilized to implement the operation depicted at block 206. As illustrated at block 214, the local monitor thread process is initiated. As described at block 216, local clipboard update notifications are registered. As described at block 218, a test is performed to determine whether or not the local clipboard has been changed. If it is determined that the local clipboard has been changed, then these changes are sent out to the remote workstations linked to the system, as indicated at block 224. Thus, as illustrated at block 220, local clipboard data is read by the system, and as depicted at block 224, updated data is sent to the participating workstations. Once the updated data is sent to the participating workstations, then the operation described at block 218 is repeated.

Remote monitor thread 204 describes specific steps utilized to implement the operation depicted at block 208. As illustrated at block 226, the remote monitor thread process is initiated. As depicted at block 228, a UDP socket is created. As illustrated at block 230, a test is then performed to determine whether or not an update has been received via the UDP socket. If so, as described at block 232, the local clipboard is updated. It if it is determined that an update has not been received, then the operation described at block 230 is repeated.

It can be appreciated by those skilled in the art that the flow diagrams presented herein depict a self-consistent sequence of steps leading to a desired result. The steps are those requiring physical manipulation of physical quantities. Usually, although not necessarily, these quantities take the form of electrical or magnetic signals capable of being stored, transferred, combined, compared, and otherwise manipulated. It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data-processing systems such as general purpose digital computers or other similar devices. In all cases the distinction between the method operations in operating a computer and the method of computation itself should be borne in mind. The present invention relates to method steps for operating a computer, such as computer system 20 depicted in FIG. 1 and FIG. 2, in processing electrical or other (e.g. mechanical, chemical) physical signals to generate other desired physical signals.

The embodiments and examples set forth herein are presented in order to best explain the present invention and its practical application and, thereby, to enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A method for sharing data in a computer network having multiple processors enrolled therein, comprising the steps of:

associating a clipboard memory with each processor enrolled in said computer network;

grouping said clipboard memories within said computer network into a shared clipboard memory;

transferring a data object from an application within a processor enrolled in said computer network to a clipboard memory associated with said processor, in response to user input;

monitoring a communications port associated with each of said multiple processors to determine when a data object has been transferred from an application within a processor to a clipboard memory associated therewith; and automatically transferring said data object to all clipboard memories within said shared clipboard memory, in response to said determination of transferring said data object from said application within said processor to said clipboard memory associated with said processor, such that objects clipped and pasted from an application in a first processor into a clipboard memory at said first processor may be removed from a clipboard memory associated with a second processor and pasted into an application at said second processor utilizing said shared clipboard memory.

2. The method of claim 1 wherein the step of transferring a data object from an application within a processor enrolled in said computer network to a clipboard memory associated with said processor, in response to user input, further comprises the step of:

transferring a data object from an application within a processor enrolled in said computer network to a clipboard memory associated with said processor, in response to user input.

3. The method of claim 2 wherein the step of associating a clipboard memory with each processor enrolled in said computer network, further comprises the step of:

associating a clipboard memory with each processor enrolled in said computer network, such that each clipboard memory associated with each processor includes a shared clipboard manager application.

4. The method of claim 3 wherein the step of associating a clipboard memory with each processor enrolled in said computer network, further comprises the step of:

associating a clipboard memory with each processor enrolled in said computer network, wherein said processor comprises a computer workstation.

5. A system for sharing data in a computer network having multiple processors enrolled therein, said system comprising:

means for associating a clipboard memory with each processor enrolled in said computer network;

means for grouping said clipboard memories within said computer network into a shared clipboard memory;

means for transferring a data object from an application within a processor enrolled in said computer network to a clipboard memory associated with said processor, in response to user input;

means for monitoring a communications port associated with each of said multiple processors to determine when a data object has been transferred from an application within a processor to a clipboard memory associated therewith, and means for automatically transferring said data object to all clipboard memories within said shared clipboard memory in response to said determination of transferring said data object from said application within said processor to said clipboard memory associated with said processor, such that objects clipped and pasted from an application in a first processor into a clipboard memory at said first processor may be removed from a clipboard memory associated with a second processor and pasted into an application at said second processor utilizing said shared clipboard memory.

6. The system of claim 5 wherein said means for transferring a data object from an application within a processor enrolled in said computer network to a clipboard memory associated with said processor, in response to user input, further comprises:

means for transferring a data object from an application within a processor enrolled in said computer network to a clipboard memory associated with said processor, in response to user input.

7. The system of claim 6 wherein said means for associating a clipboard memory with each processor enrolled in said computer network, further comprises:

means for associating a clipboard memory with each processor enrolled in said computer network, such that each clipboard memory associated with each processor includes a shared clipboard manager application.

8. The system of claim 7 wherein said means for associating a clipboard memory with each processor enrolled in said computer network, further comprises:

means for associating a clipboard memory with each processor enrolled in said computer network, wherein said processor comprises a computer workstation.

9. A program product residing in computer memory in a computer system, for sharing data in a computer network having multiple processors enrolled therein, said program product comprising:

means for associating a clipboard memory with each processor enrolled in said computer network;

means for grouping said clipboard memories within said computer network into a shared clipboard memory;

means for transferring a data object from an application within a processor enrolled in said computer network to a clipboard memory associated with said processor, in response to user input;

means for monitoring a communications port associated with each of said multiple processors to determine when a data object has been transferred from an application within a processor to a clipboard memory associated therewith;

means for automatically transferring said data object to all clipboard memories within said shared clipboard memory, in response to said determination of transferring said data object from said application within said processor to said clipboard memory associated with said processor, such that objects clipped and pasted from an application in a first processor into a clipboard memory at said first processor may be removed from a clipboard memory associated with a second processor and pasted into an application at said second processor utilizing said shared clipboard memory;

signal bearing media bearing:

said means for associating a clipboard memory with each processor en rolled in said computer network;

said means for grouping said clipboard memories within said computer network into a shared clipboard memory;

said means for transferring a data object from an application with in a processor enrolled in said computer network to a clipboard memory associated with said processor, in response to user input;

said means for monitoring a communications port associated with each of said multiple processors to determine when a data object has been transferred from an application within a processor to a clipboard memory associated therewith;

said means for automatically transferring said data object to all clipboard memories, within said shared clipboard memory in response to said determination of transferring said data object from said application within said processor to said clipboard memory associated with said processor, such that objects clipped and pasted from an application in a first processor into a clipboard memory at said first processor may be removed from a clipboard memory associated with a second processor and pasted into an application at said second processor utilizing said shared clipboard memory.

10. The program product of claim 9 wherein said means for transferring a data object from an application within a processor enrolled in said computer network to a clipboard memory associated with said processor, in response to user input, further comprises:

means for transferring a data object from an application within a processor enrolled in said computer network to a clipboard memory associated with said processor, in response to user input.

11. The program product of claim 10 wherein said means for associating a clipboard memory with each processor enrolled in said computer network, further comprises:

means for associating a clipboard memory with each processor enrolled in said computer network, such that each clipboard memory associated with each processor includes a shared clipboard manager application.

12. The program product of claim 11 wherein said means for associating a clipboard memory with each processor enrolled in said computer network, further comprises:

means for associating a clipboard memory with each processor enrolled in said computer network, wherein said processor comprises a computer workstation.

13. The program product of claim 9 wherein said signal bearing media further comprises transmission media.

14. The program product of claim 9 wherein said signal bearing media further comprises recordable media.

* * * * *